United States Patent
Jeong (10) Patent No.: US 10,826,094 B2
(45) Date of Patent: Nov. 3, 2020

(54) FUEL CELL THERMAL MANAGEMENT SYSTEM AND CONTROL METHOD OF THE SAME

(71) Applicants: Hyundai Motor Company, Seoul (KR); Kia Motors Corporation, Seoul (KR)

(72) Inventor: Seong Cheol Jeong, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 130 days.

(21) Appl. No.: 15/995,786

(22) Filed: Jun. 1, 2018

(65) Prior Publication Data

US 2019/0181476 A1 Jun. 13, 2019

(30) Foreign Application Priority Data

Dec. 7, 2017 (KR) .................. 10-2017-0167757

(51) Int. Cl.

| H01M 8/04 | (2016.01) |
|---|---|
| H01M 8/04746 | (2016.01) |
| H01M 8/04537 | (2016.01) |
| H01M 8/0432 | (2016.01) |
| H01M 8/04664 | (2016.01) |

(Continued)

(52) U.S. Cl.
CPC ... *H01M 8/04768* (2013.01); *H01M 8/04029* (2013.01); *H01M 8/04074* (2013.01); *H01M 8/04303* (2016.02); *H01M 8/04358* (2013.01); *H01M 8/04559* (2013.01); *H01M 8/04589* (2013.01); *H01M 8/04664* (2013.01); *H01M 8/04776* (2013.01); *H01M 8/04947* (2013.01)

(58) Field of Classification Search
CPC ..................................................... H01M 8/04
See application file for complete search history.

(56) References Cited

U.S. PATENT DOCUMENTS

| 2013/0323539 A1* | 12/2013 | Furusawa | H01M 8/04007 |
|---|---|---|---|
| | | | 429/9 |
| 2016/0141647 A1* | 5/2016 | Yamada | H01M 8/04037 |
| | | | 429/434 |

(Continued)

FOREIGN PATENT DOCUMENTS

KR 10-2009-0039892 4/2009

*Primary Examiner* — Jacob B Marks
(74) *Attorney, Agent, or Firm* — Mintz Levin Cohn Ferris Glovsky and Popeo, P.C.; Peter F. Corless (57) ABSTRACT

A thermal management system for a fuel cell includes: a fuel cell stack; a heater connected with the fuel cell stack in parallel through a coolant channel and configured to heat coolant; a pump circulating the coolant; a bypass valve controlling a flow rate of the coolant to be supplied to the fuel cell stack or the heater; a radiator allowing the coolant to exchange heat with external air; a heat dissipation fan supplying the external air to the radiator; a temperature control valve controlling the flow rate of the coolant flowing through the radiator; a temperature sensor disposed at an outlet of the fuel cell stack or an outlet of the heater; and a controller controlling the heater, the pump, the bypass valve, the heat dissipation fan, or the temperature control valve on the basis of temperature sensed by the temperature sensor.

12 Claims, 5 Drawing Sheets

(51) Int. Cl.
*H01M 8/04303* (2016.01)
*H01M 8/04828* (2016.01)
*H01M 8/04029* (2016.01)
*H01M 8/04007* (2016.01)

(56) References Cited

U.S. PATENT DOCUMENTS

2016/0372768 A1\* 12/2016 Procter ............... H01M 8/0494
2017/0237092 A1\* 8/2017 Ogawa .............. H01M 8/04303
429/9

\* cited by examiner

FUEL CELL THERMAL MANAGEMENT SYSTEM AND CONTROL METHOD OF THE SAME

CROSS-REFERENCE TO RELATED APPLICATION

This application claims under 35 U.S.C. § 119(a) the benefit of Korean Patent Application No. 10-2017-0167757, filed on Dec. 7, 2017 in the Korean Intellectual Property Office, the entire contents of which are incorporated herein by reference.

BACKGROUND

1. Technical Field

The present disclosure relates to a fuel cell thermal management system and a control method of the same, including sensing a failure of the fuel cell thermal management system and a fail-safe operation according to the sensed failure.

2. Description of the Related Art

In general, a fuel cell is a device that directly converts fuel into electrical energy, and includes a pair of electrodes, namely a cathode and an anode, arranged with an electrolyte therebetween, where the fuel cell generates electricity and heat through an electrochemical reaction of ionized fuel gas.

Existing systems used in fuel cell vehicles include a fuel cell stack generating electrical energy from an electrochemical reaction of a reactive gas, a hydrogen supplier supplying hydrogen that is fuel to the fuel cell stack, an air supplier supplying air containing oxygen that is an oxidizer for the electrochemical reaction to the fuel cell stack, a thermal management system controlling the temperature of the fuel cell stack at an optimum level by discharging heat, which is a byproduct of the electrochemical reaction in the fuel cell stack, to the outside, etc.

In order to maintain the lifespan and performance and ensure stable output of a fuel cell, if the fuel cell is polymer electrolyte membrane fuel cell, it is required to maintain the temperature of the fuel cell within the range of about 25° C. (room temperature) to 80° C. Accordingly, since it is required to cool the stack in order to prevent an increase in temperature of the stack in a fuel cell system, a thermal management system is necessary.

In order to maintain the temperature of a fuel cell stack at an optimum level, thermal management systems generally use a method of cooling the stack by circulating water through a coolant channel in the stack.

A Thermal Management System (TMS) includes a coolant line that is disposed between a fuel cell stack and a radiator to circulate coolant, a bypass line and a 3-way valve that make the coolant bypass the radiator, a pump that pumps and sending the coolant under pressure to the coolant line, a heater that heats the coolant, etc. Further, it is possible to obtain effects of preventing deterioration of a stack, improving durability of the stack, improving cold start ability, and expanding regenerative braking from a coolant heater.

In order to prevent deterioration of durability of a stack due to corrosion of catalyst support carbon in start-up/shutdown of a fuel cell system, power generation by reaction of hydrogen and oxygen is consumed as thermal energy by applying Cathode Oxygen Depletion (COD) to both terminals of the stack.

Accordingly, other than COD, a heater that can rapidly heat coolant to enable a stack to smoothly generate power at temperature under a freezing point after the engine of a vehicle is started is required. Further, when such a heater for heating coolant is provided separately from COD, the manufacturing cost of a vehicle may be increased and a layout space cannot be secured. Therefore, a COD-combined heater for a fuel cell vehicle in which a heater function for securing cold start ability of a fuel cell vehicle and the existing COD function for securing durability of a stack are integrated is used.

However, in the related art, when a COD-combined heater or a coolant valve fails, the range for diagnosing the failure was very limited, and a fail-safe operation under a diagnosed failure was also limited.

The description provided above as a related art of the present disclosure is just for helping understanding the background of the present disclosure and should not be construed as being included in the related art known by those skilled in the art.

SUMMARY

The present disclosure is arranged to diagnose a failure of a thermal management system for a fuel cell in various ways and to provide a diagnosis operation for a diagnosed failure.

In accordance with an aspect of the present disclosure, there is provided a thermal management system for a fuel cell, the thermal management system including: a fuel cell stack; a heater connected with the fuel cell stack in parallel through a coolant channel and configured to heat coolant using power from a main bus terminal connected to the fuel cell stack; a pump circulating the coolant; a bypass valve controlling a flow rate of the coolant to be supplied to the fuel cell stack or the heater; a radiator allowing the coolant to exchange heat with external air; a heat dissipation fan supplying the external air to the radiator; a temperature control valve controlling the flow rate of the coolant flowing through the radiator; a temperature sensor disposed at an outlet of the fuel cell stack or an outlet of the heater; and a controller controlling the heater, the pump, the bypass valve, the heat dissipation fan, or the temperature control valve on the basis of temperature sensed by the temperature sensor.

The controller may control the heater to heat the coolant when it is required to decrease the voltage of the fuel cell stack.

The controller may control the flow rate of the coolant that is supplied to the heater by controlling the bypass valve when the heater heats the coolant.

In accordance with another aspect of the present disclosure, there is provided a method of controlling a thermal management system for a fuel cell, the method including: providing the thermal management system (e.g., including components as previously described), diagnosing the thermal management system for the fuel cell; and controlling a fail-safe operation of the thermal management system on the basis of the diagnosis result.

The diagnosing may diagnose a faulty connection or a malfunction in the heater.

When the heater is continuously connected regardless of an instruction from the controller, the continuous connection of the heater may be diagnosed as a faulty connection of the heater, and when the heater cannot be continuously connected regardless of an instruction from the controller, it may be diagnosed that the heater cannot be continuously connected.

After the controller operates the heater, a malfunction in the heater may be diagnosed on the basis of a change in temperature of coolant or a current flowing through the heater.

When the heater is operated after supplying air to the fuel cell stack is finished, a malfunction in the heater may be diagnosed on the basis of a voltage of the fuel cell stack or a current flowing through the heater.

The diagnosing may diagnose faulty communication or a malfunction in the bypass valve.

A malfunction in the bypass valve may be determined when the difference between the value of the degree of opening of the bypass valve given by the controller and the actual value of the degree of opening of the bypass valve is a predetermined value of the degree of opening or more.

When it is diagnosed that the heater remains connected in the diagnosing and the State of Charge (SOC) of a high-voltage battery is a predetermined SOC or less, the controlling of a fail-safe operation may shut down the fuel cell system.

The predetermined SOC may be equal to or higher than the SOC of a high-voltage battery that is maintained in normal operation of the fuel cell system.

In the diagnosing, when faulty communication or a malfunction in the bypass valve is diagnosed and the voltage of the fuel cell stack is a predetermined level or more when hydrogen is supplied in the early stage of starting up the fuel cell system, hydrogen purge control may be performed in the controlling of a fail-safe operation.

In the previous shut-down of the fuel cell system in the diagnosing, when COD control fails and the time for maintaining shut-down is a predetermined time or more, hydrogen purge control can be performed in the controlling of a fail-safe operation.

When faulty communication or a malfunction is diagnosed in the bypass valve in the diagnosing, the controlling of a fail-safe operation may not operate the heater.

When a faulty connection or a malfunction is diagnosed in the heater in the diagnosing, in the controlling of a fail-safe operation, when it is required to increase the temperature of coolant, it may be possible to control the pump or the heat dissipation fan at predetermined RPM or control the temperature control valve such that coolant does not flow through the radiator.

When a faulty connection or a malfunction is diagnosed in the heater or faulty communication or a malfunction is diagnosed in the bypass valve in the diagnosing, in the controlling of a fail-safe operation, when the SOC of the high-voltage battery is a predetermined maximum SOC or more in generative braking, it may be possible to control the pump or the heat dissipation fan at predetermined RPM.

According to the thermal management system for a fuel cell and the method of controlling the thermal management system of the present disclosure, it is possible to diagnose malfunctions in a heater and bypass valve in various ways.

Further, it is possible to enhance individual fail-safe operations depending on the types of failures in the thermal management system.

Further, it is possible to improve cold start-up performance and durability of the fuel cells tack even if the thermal management system fails.

Further, when a vehicle is driven down on a hill for a long time, it is possible to secure braking force and improve durability of a friction brake by maximally consuming regenerative energy.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The description of a specific configuration or function with respect to the embodiments according to a concept of the present disclosure disclosed in the present specification merely is an example for a purpose of describing the embodiment according to the concept of the present disclosure. Therefore, the embodiments according to the concept of the present disclosure may be implemented in various forms, but the present disclosure is not limited to the embodiments described in the description.

The embodiments according to the concept of the present disclosure may be changed and modified in various forms. Thus, the embodiments will be illustrated in the drawings and described in the present specification. However, it should be understood that the present disclosure is not limited to the specific embodiments, but the present disclosure includes all modifications, equivalents, and alternatives within the spirit and the scope of the present disclosure.

Hereinafter, a preferred embodiment of the present disclosure will be described in detail with reference to the accompanying drawings. Identical reference numerals illustrated in the drawings denote identical members.

Figure 1:
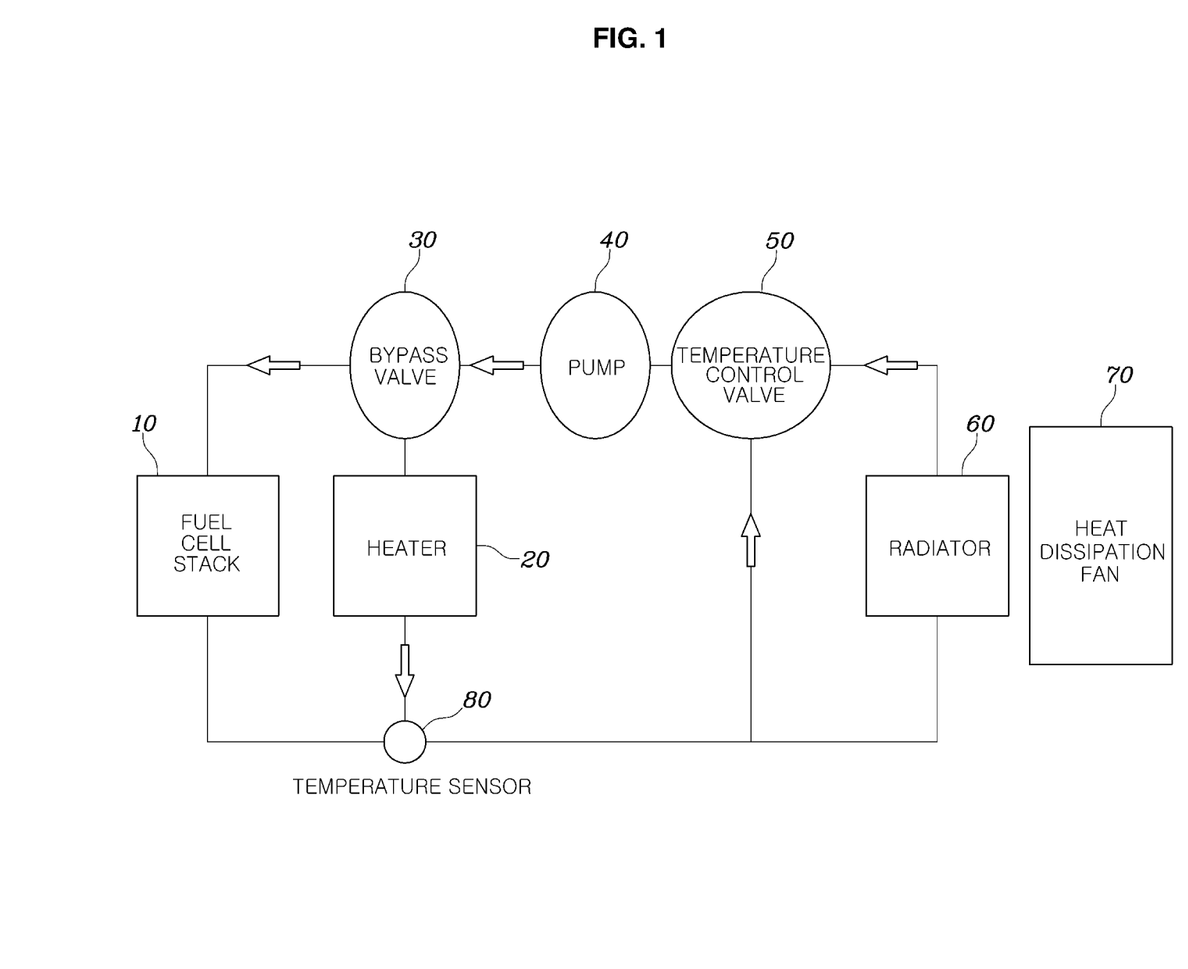
FIG. 1 is a diagram showing the configuration of a thermal management system for a fuel cell according to an embodiment.

FIG. 1 is a diagram showing the configuration of a thermal management system for a fuel cell according to an embodiment.

Referring to FIG. 1, a thermal management system for a fuel cell according to an embodiment includes: a fuel cell stack 10; a heater 20 connected with the fuel cell stack 10 in parallel through a coolant channel and configured to heat coolant using power from a main bus terminal connected to the fuel cell stack 10; a pump 40 circulating the coolant; a bypass valve 30 controlling a flow rate of the coolant to be supplied to the fuel cell stack 10 or the heater 20; a radiator 60 allowing the coolant to exchange heat with external air; a heat dissipation fan 70 supplying the external air to the radiator 60; a temperature control valve 50 controlling the flow rate of the coolant flowing through the radiator 60; a temperature sensor 80 disposed at an outlet of the fuel cell stack 10 or an outlet of the heater 20; and a controller controlling the heater 20, the pump 40, the bypass valve 30, the heat dissipation fan 70, or the temperature control valve 50 on the basis of temperature sensed by the temperature sensor 80.

The fuel cell stack 10 can generate power through a chemical reaction by receiving air and hydrogen. Coolant can be supplied into the fuel cell stack 10 to discharge heat that is a byproduct that is produced by the chemical reaction.

The heater 20 may be connected to the fuel cell stack 10 in parallel through one or more coolant channels. The heater 20 may be a resistance heater that generates heat by receiving power from the main bus terminal, or may heat the coolant by generating heat.

For reference, a fuel cell system as described herein is generally known, and may include a fuel cell stack 10 generating a chemical reaction of a fuel cell, a hydrogen/air supply system for reaction of the fuel cell stack 10, a thermal management system, and a power supply system extracting power generated by the fuel cell stack 10.

In particular, start-up/shut-down of a fuel cell system mounted on a fuel cell vehicle may be performed simultaneously with starting/stopping of an engine of the vehicle, but a fuel cell may be started up/shut down in accordance with start or stop of the fuel cell during driving.

In order to prevent deterioration of durability of the fuel cell stack 10 in start-up/shut-down of the fuel cell system, power generation by reaction of hydrogen and oxygen can be consumed as thermal energy by coupling Cathode Oxygen Depletion (COD) to both terminals of the fuel cell stack 10. The heater 20 of the present disclosure can be also used for COD.

The COD is provided to prevent deterioration of the fuel cell stack 10 due to oxygen, which remains at a cathode, flowing to an anode in start-up/shut down of the fuel cell system. To this end, it is possible to consume power at the main bus terminal, using the heater 20.

The heater 20 can generate heat from the main bus terminal to increase the temperature of the coolant when it is required to increase the temperature of the coolant, but can consume power at the main bus terminal to decrease the voltage of the fuel cell stack 10. In particular, the heater 20 may be operated to consume power at the main bus terminal to keep regenerative braking when the fuel cell system is started up/shut down and the SOC of a high-voltage battery is sufficient.

Accordingly, the controller can control the heater 20 to heat the coolant when it is required to decrease the voltage of the fuel cell stack 10. The controller can control the flow rate of the coolant that is supplied to the heater 20 by controlling the bypass valve 30 when the heater 20 heats the coolant.

The coolant pump 40 can be operated to circulate the coolant through the coolant channels.

The bypass valve 30 can control the flow rate of the coolant that is supplied to the fuel cells stack 10 or the heater 20. That is, the bypass valve 30 may be disposed between the coolant pump 40 and a diverging point to the fuel cell stack 10 and the heater 20, so it can control the coolant supplied from the coolant pump 40 to be supplied to the fuel cell stack 10 or the heater 20.

The radiator 60 can be exposed to the external air so that the coolant exchanges heat with the external air and may include the heat dissipation fan 70 that supplies the external air to the radiator 60 to increase heat exchange efficiency.

The temperature control valve 50 can control the flow rate of the coolant flowing through the radiator 60. In particular, the temperature control valve 50 may be disposed between the radiator 60 and a coolant channel bypassing the radiator 60 to control the coolant to flow through or bypass the radiator 60.

The temperature sensor 80 may be disposed at the outlet of the fuel cell stack 10 or the outlet of the heater 20. The temperature sensor 80 can sense the temperature of the coolant. When the temperature sensor 80 is disposed at the outlet of the fuel cell stack 10, it can control the temperature of the coolant by determining whether the fuel cell stack 10 is operated within an appropriate operation temperature by estimating the temperature of the fuel cell stack 10. When the temperature sensor 80 is disposed at the outlet of the heater 20, it can estimate the amount of heat generated by the heater 20.

The controller may be included in a Fuel Cell Controller (FCU) or may be a separate controller of the thermal management system. The controller can control the heater 20, the pump 40, the bypass valve 30, the heat dissipation fan 70, or the temperature control valve 50 on the basis of sensed by the temperature sensor 80. In particular, the controller, which controls the temperature of the coolant within a predetermined range, may operate the heater 20 or control the RPM of the pump 40 or the heat dissipation fan 70. The controller may control the flow of the coolant by controlling the degree of opening of the bypass valve 30 or the temperature control valve 50.

Figure 2:
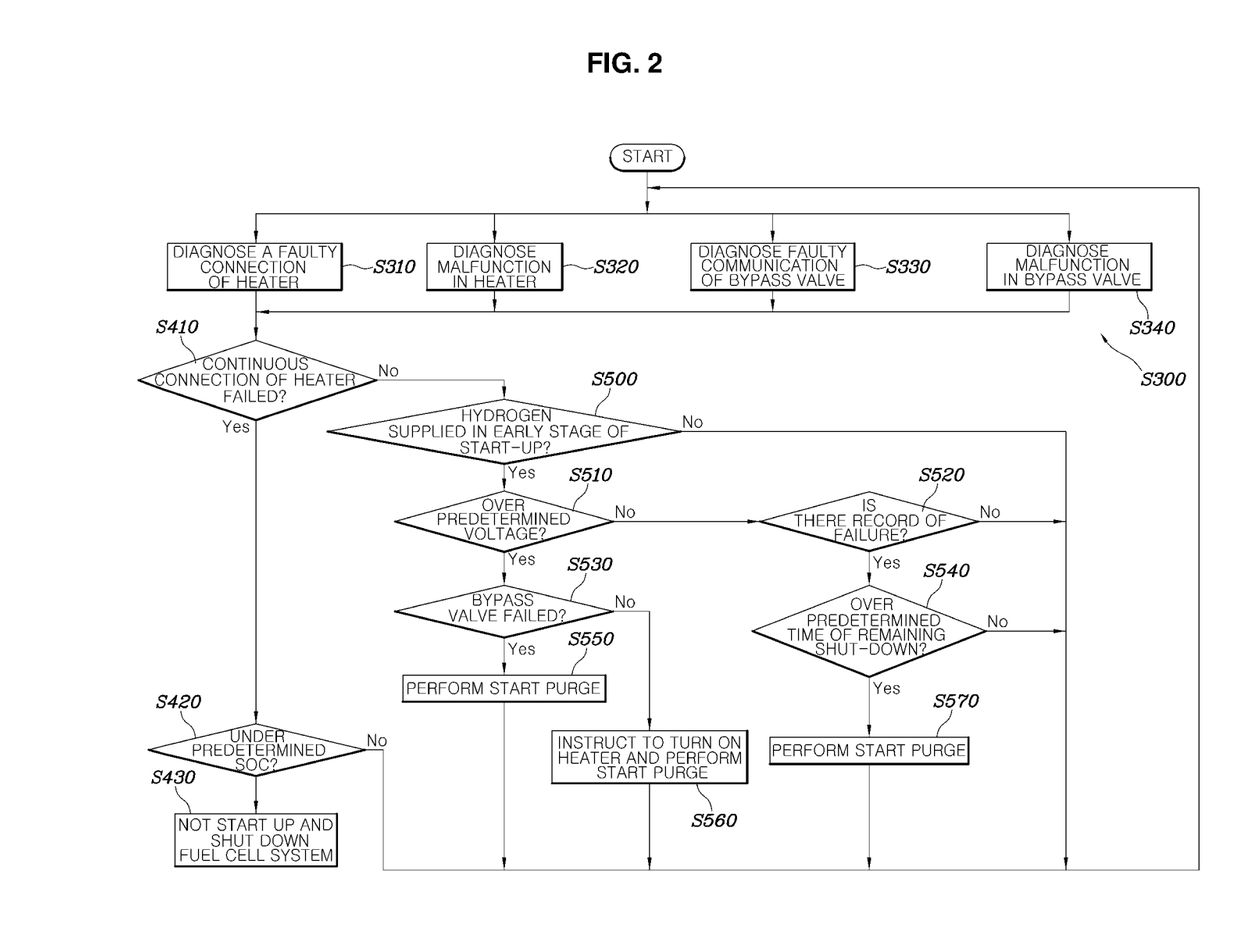
FIGS. 2 to 3 are flowcharts showing a method of controlling a thermal management system for a fuel cell according to an embodiment.
Figure 3:
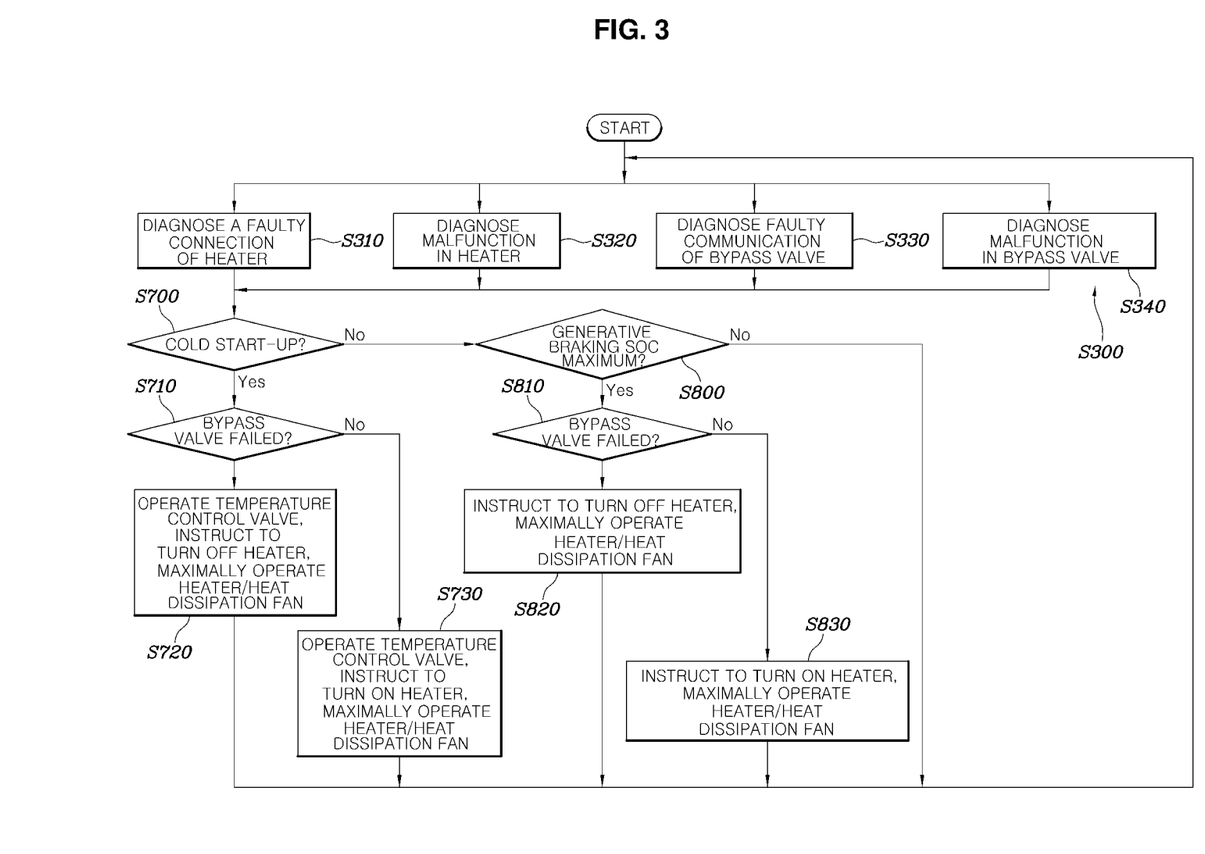

FIGS. 2 to 3 are flowcharts showing a method of controlling a thermal management system for a fuel cell according to an embodiment.

Referring to FIGS. 2 and 3, a method of controlling the thermal management system for a fuel cell according to an embodiment includes: a step of diagnosing a thermal management system for a fuel cell (S300); and controlling a fail-safe operation of the thermal management system (i.e., each situation in which the thermal management system operates) on the basis of the diagnosis result (S430, S550, S560, S570, S720, S730, S820, S830).

The diagnosis step (S300) can diagnose a faulty connection or a malfunction in the heater (S310, S320).

In particular, when the heater is continuously connected regardless of an instruction from the controller, the continuous connection of the heater can be diagnosed as a faulty connection of the heater. For example, when a heat circuit is disconnected from the ground, the heater may keep connected to the main bus terminal and keep generating heat even if the controller gives an instruction to disconnect the heater.

Further, when the heater cannot be continuously connected regardless of an instruction from the controller, it may be diagnosed that the heater cannot be continuously connected. For example, the heater circuit is short-circuited or disconnected from the main bus terminal, the heater cannot be connected and cannot generate heat even if the controller gives an instruction to connect the heater.

Figure 4:
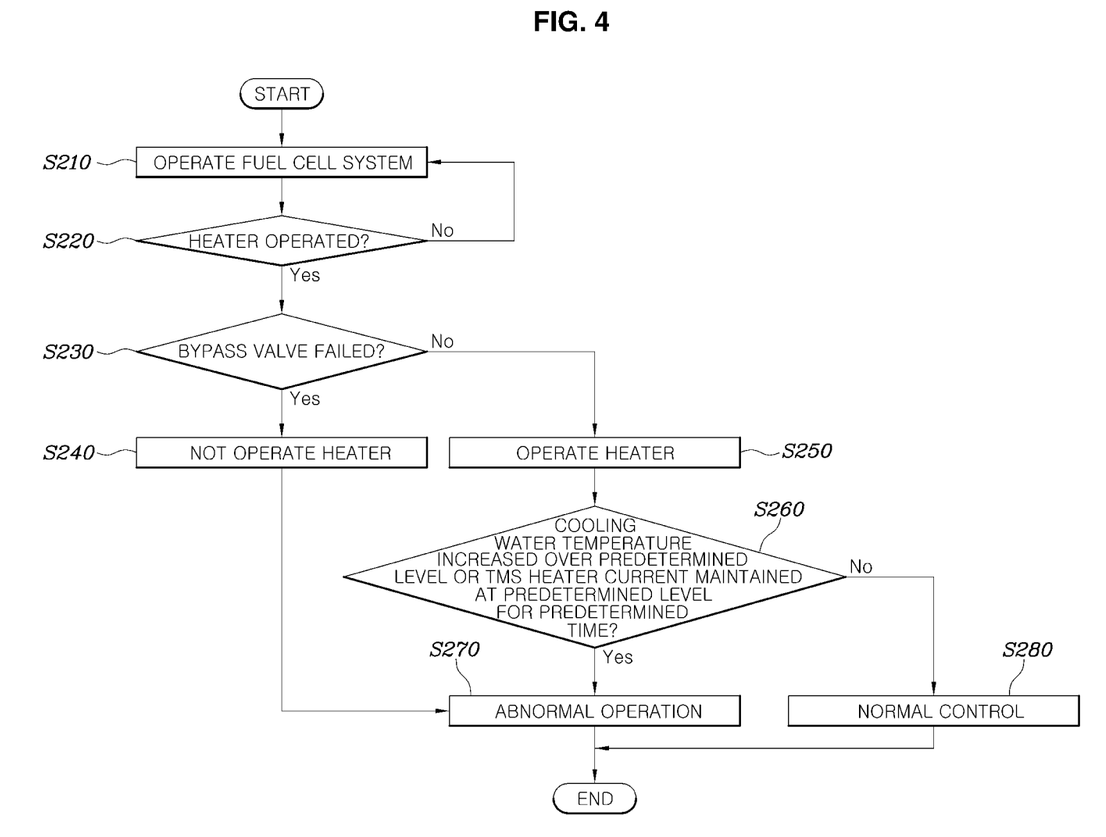
FIG. 4 is a flowchart determining a failure of a heater according to an embodiment.

FIG. 4 is a flowchart determining a failure of a heater according to an embodiment.

Referring to FIG. 4, the heater may be operated (S220) before whether the heater has a malfunction (S260). When the fuel cell system is operated (S210), the controller operates the heater by giving an instruction to operate the heater (S220), and then it is determined whether the heater normally operates or malfunctions.

It may be possible to determine a malfunction in the bypass valve before determining a malfunction in the heater (S260). When the bypass valve fails, it is possible to stop the heater (S240), and only when the bypass valve does not fail, it is possible to operate the heater and determine whether the heater malfunctions (S250), i.e., because if it is impossible to control the coolant to be supplied to the heater by controlling the bypass valve, it has no effect to operate the heater and a dangerous situation may occur due to overheating of the heater.

That is, it is preferable to determine a failure of the bypass valve before determining a failure of the heater, i.e., because it is preferable not to operate the heater when the bypass valve fails.

It is possible to determine a malfunction in the heater on the basis of a change in temperature of coolant or the current flowing through the heater (S260) after the controller operates the heater (S250). In particular, it is possible to determine a malfunction in the heater on the basis of whether the temperature of coolant has not been increased yet up to a predetermined level for a predetermined time even though the controller gave an instruction to operate the heater.

Alternatively, it is possible to determine a malfunction in the heater on the basis of whether the current flowing through the heater has not reached a predetermined level for a predetermined time. It is possible to directly measure the current flowing through the heater using a current sensor or indirectly measure the current by subtracting a current consumed by a driving motor or accessories from the current generated by the stack.

Accordingly, when it is determined that there is a malfunction in the heater, a fail-safe operation mode is entered (S270), and when it is determined that there is no malfunction in the heater, the heater is normally controlled (S280).

Figure 5:
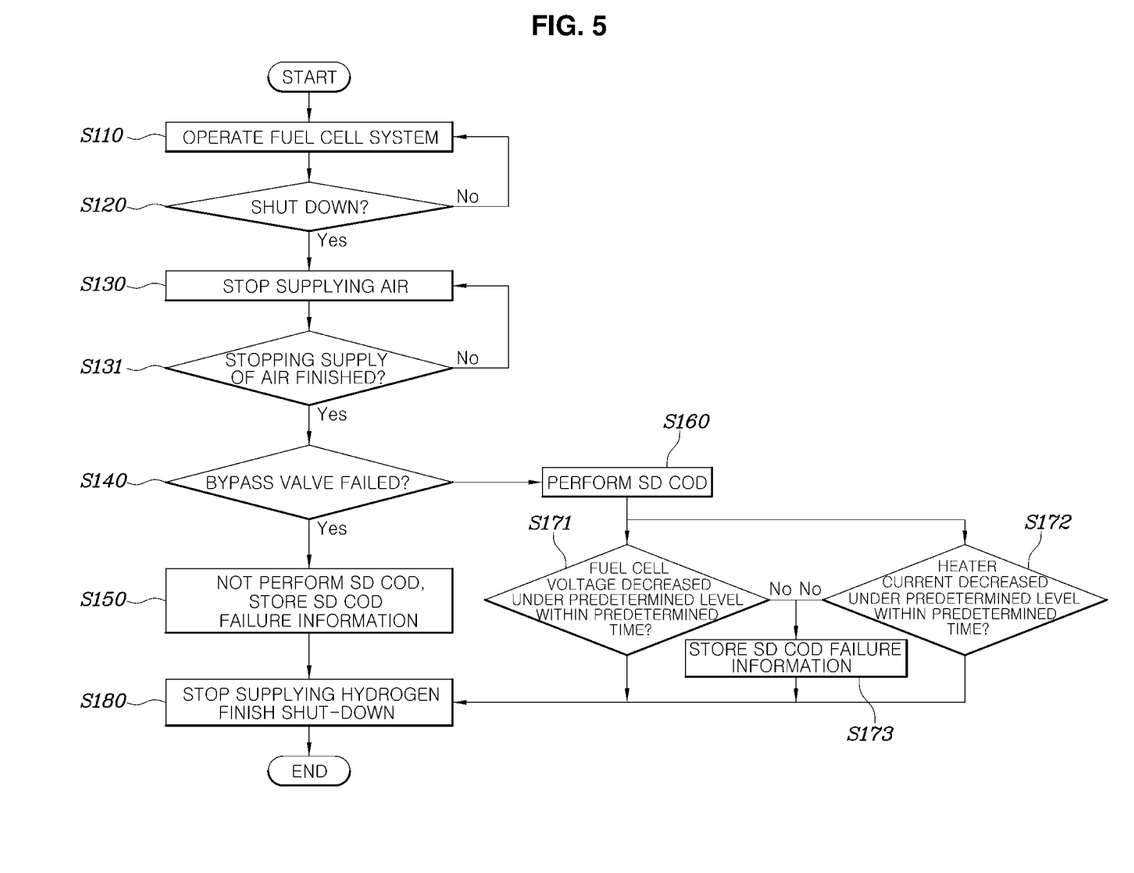
FIG. 5 is a flowchart determining a malfunction in a heater in shut-down of a fuel cell system according to an embodiment.

FIG. 5 is a flowchart determining a malfunction in a heater in shut-down of a fuel cell system according to an embodiment.

Referring to FIG. 5, it is possible to determine a malfunction in the heater in shut-down of the fuel cell system. It is possible to determine a malfunction in the heater on the basis of the voltage of the fuel cell stack or the current flowing through the heater when the heater is operated after it is finished to stop supplying air to the fuel cell stack (S171, S172).

In particular, it is possible to determine a malfunction in the heater after it is finished to stop supplying air in shut-down of the fuel cell system. While the fuel cell system is operated (S110), it is possible to whether it is in shut-down (S120), and it is possible to stop supplying air to shut down the fuel cell system (S130).

Determining whether the stopping of air being supplied is finished (S131) may be performed by referring to a sensed air flow rate, the RPM of an air compressor, the degree of opening of an Air Control Valve (ACV), etc.

After the stopping of air being supplied is finished, it is possible to determine whether there is a failure in the bypass valve (S140). When the bypass valve fails, the heater cannot be operated, so it is possible to store failure information without performing shut-down COD (S150). When the shut-down COD also fails, it is possible to stop supplying hydrogen and finish shut-down (S180).

If the bypass valve does not fail, it is possible to perform shut-down COD by operating the heater (S160). When the voltage of the fuel cell does not decrease to a predetermined level or less even if the heater has been operated for a predetermined time (S171) or when the amount of the current flowing through the heater is a predetermined level or less for a predetermined time, it is possible to determine that the heater malfunctions. When shut-down COD fails due to a malfunction in the heater, it is possible to store shut-down failure information (S173). Further, it is possible to determine that the heater malfunctions, simultaneously with storing the shut-down COD failure information.

Shut-down COD may fail due to not only a malfunction in the heater or a failure of the bypass valve, but a failure of the pump or a failure of the temperature control valve. Even if the shut-down COD succeeds or fails, it is possible to stop supplying hydrogen and shut down the fuel cell system (S180).

Referring to FIGS. 2 and 3, the diagnosis step (S300) can determine faulty communication (S330) or a malfunction in the bypass valve (S340). Although it is shown in the figures that failures of the bypass valve and the heater are simultaneously determined in the diagnosis step, they may be simultaneously determined or the failure of the bypass valve may be determined first.

Faulty communication of the bypass valve may occur when CAN communication is impossible between the controller and the bypass valve. Accordingly, an instruction may not be transmitted to the bypass valve from the controller.

A malfunction in the bypass valve can be determined when the difference between the value of the degree of opening of the bypass valve given by the controller and the actual value of the degree of opening of the bypass valve is a predetermined value of the degree of opening or more. In particular, the controller can give an instruction about the degree of opening of the bypass valve, and accordingly, the bypass valve can control the degree of opening. When the difference between the given value of the degree of opening of the bypass valve and the actual value of the degree of opening of the bypass valve is a predetermined value of the degree of opening or more, it is possible to determine that the bypass valve malfunctions without operating at the value of the degree of opening given by the controller.

When it is determined that the heater remains connected (S410) in the diagnosis step (S300), the fail-safe operation control step can shut down the fuel cell system (S430) when the State of Charge (SOC) of a high-voltage battery is a predetermined SOC or less (S420).

That is, when it is diagnosed that the heater remains connected in the diagnosis, the heater may be unnecessarily operated regardless of an instruction from the controller. Accordingly, power is consumed at the main bus terminal connected with the high-voltage battery, and as a result, the power of the high-voltage battery is consumed, so it may be impossible later to start the fuel cell system, or the engine of a fuel cell vehicle or the battery may be damaged.

Accordingly, when the SOC of the high-voltage battery is checked and it is a predetermined SOC or less (S420), it is possible to shut down the fuel cell system. The predetermined SOC may be set in consideration of damage to the high-voltage battery or the amount of power for starting up the fuel cell system. Further, the predetermined SOC may be equal to or higher than the SOC of a high-voltage battery that is maintained in normal operation of the fuel cell system. This is because if the SOC is set lower than the SOC of a high-voltage battery that is maintained in normal operation of the fuel cell system, as the SOC of the high-voltage battery decreases, the fuel cell stack continuously generates power, so the energy that charges the high-voltage battery and is unnecessarily wasted may be increased.

In the diagnosis step (S300), when faulty communication or a malfunction in the bypass valve is diagnosed and the voltage of the fuel cell stack is a predetermined level or more (S510) when hydrogen is supplied in the early stage of starting up the fuel cell system (S500), hydrogen purge control can be performed in the fail-safe operation control step (S550, S560).

In the early stage of starting up the fuel cell system (S550), when hydrogen is supplied in the early stage of staring-up for removing oxygen at the anode to prevent deterioration of the fuel cell, it is possible to determine that oxygen has flow into the anode by checking the voltage of the fuel cell stack. Accordingly, when the voltage of the fuel cell stack is a predetermined level or more when hydrogen is supplied in the early stage of starting-up, start-up COD and hydrogen purge can be performed (S560).

If when faulty communication or a malfunction is diagnosed in the bypass valve in the diagnosis step (S530), it is impossible to perform start-up COD using the heater, so it is possible to remove oxygen and increase concentration of hydrogen at the anode by performing only hydrogen purge (S550).

In the previous shut-down of the fuel cell system in the diagnosis step, when COD control fails (S520) and the time for maintaining shut-down is a predetermined time or more (S540), hydrogen purge control can be performed (S570) in the fail-safe operation control step.

Even if the voltage is less than predetermined level when hydrogen is supplied in the early stage of start-up (S510), when there is a record of a failure of impossible SD (shutdown) COD in the previous start-up (S520), it may be required to remove oxygen at the anode. In this case, the time for which shut-down is maintained is checked and when the time is a predetermined time or longer, it is possible to increase the concentration of hydrogen by performing hydrogen purge (S570).

The predetermined level may be based on the entire voltage of the fuel cell stack or the cell voltage, and when start-up COD and hydrogen purge are simultaneously performed and when only hydrogen purge is performed because the start-up COD cannot be performed, the cycle of the hydrogen purge, the purge amount, and the continuous purge time may be varied. The reference of the time for which shut-down is maintained may be appropriately set in consideration of the degree of closing of the cathode of the fuel cell and diffusion of hydrogen/oxygen.

When a faulty connection or a malfunction is diagnosed in the heater in the diagnosis step, in the fail-safe operation control step, when it is required to increase the temperature of coolant (S700), it is possible to control the pump or the heat dissipation fan at predetermined RPM or control the temperature control valve such that coolant does not flow through the radiator (S720, S730).

When the fuel cell system is started up at a low temperature of external air (cold start-up) or when it is required to increase the temperature of coolant during driving due to too low temperature of external air (S700), it is possible to quickly increase the temperature of the coolant, using the heat generated by the heater (S730).

However, when faulty communication or a malfunction is diagnosed in the bypass valve in the diagnosis step (S710), the fail-safe operation control step does not operate the heater (S720).

In the diagnosis step, when a faulty connection or a malfunction is diagnosed in the heater or when faulty communication or a malfunction is diagnosed in the bypass valve and the heater cannot be operated, it is possible to improve the cold start-up performance, using as many accessories as possible (S720).

In particular, it is possible to control the temperature control valve such that coolant is not supplied to the radiator and control the pump or the heat dissipation fan at predetermined RPM. The predetermined RPM may be possible maximum RPM. Alternatively, it may be maximum RPM within a range where noise is not made. In cold start-up with a fuel cell vehicle stopped, the heat dissipation fan may not be started because it makes large noise.

When a faulty connection or a malfunction is diagnosed in the heater or faulty communication or a malfunction is diagnosed in the bypass valve in the diagnosis step, in the fail-safe operation control step, when the SOC of the high-voltage battery is a predetermined maximum SOC or more in generative braking (S800), it is possible to control the pump or the heat dissipation fan at predetermined RPM.

In a fuel cell vehicle, a high-voltage battery can be charged with regenerated by braking when the vehicle is driven down a hill (downhill road). However, when the vehicle is driven down a hill for a long time and the SOC of the high-voltage battery reaches a level where charging is no more possible (S800), it is possible to maintain the braking performance while consuming regenerative braking by operating the heater (S830).

When a faulty connection or a malfunction is diagnosed in the heater or faulty communication or a malfunction is diagnosed in the bypass valve and the heater cannot be operated, it is possible to consume the energy, using accessories (S820).

In particular, when a faulty connection or a malfunction is diagnosed in the heater, it is possible to control the pump or the heat dissipation fan at predetermined RPM. The predetermined RPM may be possible maximum RPM. Alternatively, it may be maximum RPM within a range where noise is not made. In this case, the controller can keep control the temperature of the coolant to be maintained by controlling the temperature control valve on the basis of the temperature sensed by the temperature sensor.

When faulty communication or a malfunction is diagnosed in the bypass valve, it is possible to control the heat dissipation at predetermined RPM. In this case, it is possible to control only the heat dissipation fan at the maximum RPM without controlling the temperature control valve and the pump.

When only a faulty connection or a malfunction is diagnosed in the heater and faulty communication or a malfunction is not diagnosed in the bypass valve, the controller can keep giving an instruction to operate the heater (S830). Accordingly, if the heater is normally operated, it can be immediately used.

Accordingly, it is possible to maintain regenerative braking as long as possible by consuming regenerative energy as much as possible, using accessories when a vehicle is driven down on a hill for a long time, and as a result, it is possible to maintain maximum braking force as long as possible and it is possible to improve durability by minimally using a friction brake etc.

Although the present disclosure has been described and illustrated with reference to the particular embodiments thereof, it will be apparent to those skilled in the art that various improvements and modifications of the present disclosure can be made without departing from the technical idea of the present disclosure provided by the following claims.

What is claimed is:

1. A method of controlling a thermal management system for a fuel cell, comprising:
   providing the thermal management system comprising:
   a fuel cell stack;
   a heater connected with the fuel cell stack in parallel through a coolant channel and configured to heat coolant using power from a main bus terminal connected to the fuel cell stack;
   a pump circulating the coolant;
   a bypass valve controlling a flow rate of the coolant to be supplied to the fuel cell stack or the heater;
   a radiator allowing the coolant to exchange heat with external air;
   a heat dissipation fan supplying the external air to the radiator;
   a temperature control valve controlling the flow rate of the coolant, which is flowing through the radiator;
   a temperature sensor disposed at an outlet of the fuel cell stack or an outlet of the heater; and
   a controller controlling the heater, the pump, the bypass valve, the heat dissipation fan, or the temperature control valve on the basis of temperature sensed by the temperature sensor;
   diagnosing the thermal management system for the fuel cell; and
   controlling a fail-safe operation of the thermal management system on the basis of the diagnosis result,
   wherein the diagnosing diagnoses a faulty connection or a malfunction in the heater, and
   wherein when the heater is continuously connected regardless of an instruction from the controller, the continuous connection of the heater is diagnosed as a faulty connection of the heater, and when the heater cannot be continuously connected regardless of an instruction from the controller, it is diagnosed that the heater cannot be continuously connected.

2. The method of claim 1, wherein after the controller operates the heater, a malfunction in the heater is diagnosed on the basis of a change in temperature of the coolant or a current flowing through the heater.

3. The method of claim 1, wherein when the heater is operated after it is finished to stop supplying air to the fuel cell stack, a malfunction in the heater is diagnosed on the basis of a voltage of the fuel cell stack or a current flowing through the heater.

4. The method of claim 1, wherein the diagnosing diagnoses faulty communication or a malfunction in the bypass valve.

5. The method of claim 4, wherein a malfunction in the bypass valve is determined when the difference between the value of the degree of opening of the bypass valve given by the controller and the actual value of the degree of opening of the bypass valve is a predetermined value of the degree of opening or more.

6. The method of claim 1, wherein when it is diagnosed that the heater remains connected in the diagnosing and the State of Charge (SOC) of a high-voltage battery is a predetermined SOC or less, the controlling of a fail-safe operation shuts down the fuel cell system.

7. The method of claim 6, wherein the predetermined SOC is equal to or higher than the SOC of a high-voltage battery that is maintained in normal operation of the fuel cell system.

8. The method of claim 1, wherein in the diagnosing, when faulty communication or a malfunction in the bypass valve is diagnosed and the voltage of the fuel cell stack is a predetermined level or more when hydrogen is supplied in the early stage of starting up the fuel cell system, hydrogen purge control is performed in the controlling of a fail-safe operation.

9. The method of claim 1, wherein when COD control fails and the time for maintaining shut-down is a predetermined time or more as the fuel cell system is shut down in the diagnosing, hydrogen purge control can be performed in the controlling of a fail-safe operation.

10. The method of claim 1, wherein when faulty communication or a malfunction is diagnosed in the bypass valve in the diagnosing, the controlling of a fail-safe operation does not operate the heater.

11. The method of claim 1, wherein when a faulty connection or a malfunction is diagnosed in the heater in the diagnosing, in the controlling of a fail-safe operation, when it is required to increase the temperature of the coolant, it is possible to control the pump or the heat dissipation fan at predetermined RPM or control the temperature control valve such that the coolant does not flow through the radiator.

12. The method of claim 1, wherein when a faulty connection or a malfunction is diagnosed in the heater or faulty communication or a malfunction is diagnosed in the bypass valve in the diagnosing, in the controlling of a fail-safe operation, when the SOC of the high-voltage battery is a predetermined maximum SOC or more in generative braking, it is possible to control the pump or the heat dissipation fan at predetermined RPM.

* * * * *